United States Patent [19]
Guiset et al.

[11] Patent Number: 5,528,089
[45] Date of Patent: Jun. 18, 1996

[54] REMOTE POWER FEED DEVICE FOR ELECTRONIC EQUIPMENT

[75] Inventors: Mireille Guiset, Saint-Michel-Sur-Orge; Jacques Noyon, Les Ulis, both of France

[73] Assignee: Societe Dite Alcatel Cit, Paris, France

[21] Appl. No.: 175,557

[22] Filed: Dec. 30, 1993

[30] Foreign Application Priority Data

Dec. 30, 1992 [FR] France .................................. 92 15930

[51] Int. Cl.$^6$ .................................................. H03K 17/74
[52] U.S. Cl. .......................................... 307/146; 327/584
[58] Field of Search ................................... 327/526, 584, 327/595; 361/56, 91; 307/18, 146

[56] References Cited

U.S. PATENT DOCUMENTS

| | | |
|---|---|---|
| 3,601,632 | 8/1971 | Frazier .................................. 327/526 |
| 4,918,390 | 4/1990 | Ziv et al. ............................... 324/415 |

FOREIGN PATENT DOCUMENTS 1261895  4/1966  Germany .

OTHER PUBLICATIONS

Cables & Transmissions, vol. 33, No. 1, Jan. 1979, Paris, France, pp. 48–83, "Telealimentation des Equipements de Ligne en Courant Alternatif et en Courant Continu" by Y. Le Grand.

Primary Examiner—William M. Shoop, Jr.
Assistant Examiner—Jonathan S. Kaplan
Attorney, Agent, or Firm—Sughrue, Mion, Zinn, Macpeak & Seas

[57] ABSTRACT

A remote power feed device for electronic equipment comprises two branches in parallel of which a first branch includes in series as many sets of Zener diodes as there are functional systems to be powered. The other or second branch includes one or more Zener diodes. Only the Zener diodes of the first branch conduct in normal operation, i.e. in the absence of any overcurrent. The supply voltage or voltages of the various subsystems of the same functional system are the voltage(s) across a common Zener diode or common Zener diodes of a common set of Zener diodes of the first branch.

4 Claims, 2 Drawing Sheets

REMOTE POWER FEED DEVICE FOR ELECTRONIC EQUIPMENT

BACKGROUND OF THE INVENTION

1. Field of the Invention

The present invention concerns a remote power feed device for electronic equipment such as a transmission link repeater or regenerator, for example.

2. Description of the Prior Art

A repeater or regenerator designed to amplify or regenerate signals transmitted on a transmission link includes, in the usual case of a link comprising a plurality of transmission media divided into a plurality of pairs of transmission media each assigned to a particular transmission direction, a plurality of repeater or regenerator units each intended to amplify or regenerate the signals transmitted on one transmission medium. The repeater or regenerator units adapted to amplify or regenerate the signals transmitted on the two transmission media of the same pair are functionally grouped together to form what is referred to hereinafter as a functional system, the repeater or regenerator units of the same functional system being referred to hereinafter as functional subsystems and a functional group of this kind corresponding, for example, to the pooling of certain units such as supervisory units, for example The invention is not limited to an application of this kind to electronic equipment constituted of repeaters or regenerators but can be used in any application in which said electronic equipments to be fed with power remotely can be broken down in this way into functional systems and functional subsystems.

The invention concerns functional systems powered in series by a so-called remote power feed current and functional subsystems each powered by one or more voltages derived from said remote power feed current. This voltage or each voltage can be the voltage across a Zener diode through which the remote power feed current flows. For example, if two supply voltages are required at each functional subsystem, one positive and the other negative, these supply voltages could be the voltages across each of the Zener diodes of a set of two series-connected Zener diodes the common point of which constitutes the electrical reference voltage for this functional subsystem.

If is were not necessary to provide further protection against possible overcurrents due in particular to accidental breakage of the cable carrying said remote power feed current, and allowing for the fact that the maximum current tolerated by currently available Zener diodes is less than the overcurrent that would result from any such breakage, a remote power feed device could be obtained comprising, in each electronic equipment to be fed with power remotely, a single branch itself comprising as many Zener diode systems, each comprising one or more Zener diodes, as there are functional systems to be powered.

A remote power feed device of this type and further including protection against such overcurrents due in particular to accidental breakage of the cable conveying said remote power feed current is shown in FIG. 1. This device relates to two functional systems denoted E1 and E2 each comprising two functional subsystems, denoted E11 and E12 in the case of the system E1 and E21 and E22 for the system E2, and to a situation in which each of these functional subsystems requires two supply voltages, as mentioned above, one positive and the other negative, denoted +VE11 and −VE11 for the functional subsystem E11, for example.

This device includes two branches B1 and B2 between which the remote power feed current I is shared, the branch B1 including in this example four Zener diodes DZ11, DZ12, DZ13 and DZ14 and the branch B2 likewise comprising four Zener diodes DZ21, DZ22, DZ23 and DZ24, all the Zener diodes of this device having the same Zener voltage (the absolute value of which is equal in this instance to the absolute value of said positive and negative supply voltages).

The positive and negative supply voltages of the various functional subsystems are then as follows:

- the positive supply voltage +VE11 of the functional subsystem E11 is the voltage across the Zener diode DZ11,
- the negative supply voltage −VE11 of the functional subsystem E11 is the voltage across the Zener diode DZ12,
- the positive supply voltage +VE12 of the functional subsystem E12 is the voltage across the Zener diode DZ21,
- the negative supply voltage −VE12 of the functional subsystem E12 is the voltage across the Zener diode DZ22,
- the positive supply voltage +VE21 of the functional subsystem E21 is the voltage across the Zener diode DZ13,
- the negative supply voltage −VE21 of the functional subsystem E21 is the voltage across the Zener diode DZ14,
- the positive supply voltage +VE22 of the functional subsystem E22 is the voltage across the Zener diode DZ23,
- the negative supply voltage −VE22 of the functional subsystem E22 is the voltage across the Zener diode DZ24.

To allow for the fact that the Zener voltages of the Zener diodes of the two branches, although theoretically exactly the same, are not strictly the same in practice, so-called balancing resistors are provided to improve the distribution of current between the two branches in normal operation and more importantly in the event of an overcurrent (in which case the voltage drop in these resistors is preponderant) and to allow for the fact that the electrical reference potential must be common to the various subsystems of the same functional system, i.e. the Zener diodes DZ11, DZ12, DZ21 and DZ22 assigned to the functional system E1 have a common point which constitutes the reference potential REF1 for this functional system and likewise the Zener diodes DZ13, DZ14, DZ23 and DZ24 assigned to the functional system E2 have a common point which constitutes the reference potential REF2 for this functional system, there are three balancing resistors per branch, respectively R11, R12 and R13 for the branch B1 and R21, R22 and R23 for the branch B2.

The resistors R11 and R21 are in this instance localized to those portions of the branches B1 and B2 between one end A of these branches and the point at the reference potential REF1, the resistors R12 and R22 are in this instance localized to those portions of these branches between the points at the potentials REF1 and REF2, and the resistors R13 and R23 are in this instance localized to those portions of these branches between the point at the potential REF2 and the other end C of these branches.

By way of numerical example, and with particular reference to application to remote power feeding of repeaters or regenerators for transmission links, the remote power feed current I is 1.6 A, the Zener voltage of the Zener diodes is 6.2 V and the value of the balancing resistors is 2 ohms.

Although these balancing resistors have a relatively low value, it is seen that with this circuit in the event of breakage of the cable carrying the remote power feed current the voltage difference between the two points at the reference voltages REF1 and REF2 in the two functional systems E1 and E2 assumes a very high value, in the order of 512 V for the numerical values given above and for a remote power feed current featuring in such a case a pulse with an amplitude in the order of 500 A. This very high value complicates the engineering of the electrical isolation between functional systems and makes it difficult to envisage any electrical communications between functional systems within the same electronic equipment.

Also, with reference to the same circuit and excluding any current aggression problem due in particular to breakage of the cable carrying the remote power feed current, the voltage drop across the device in question including three balancing resistors per branch is, with the numerical values given above, equal to (6.2 V×4)+(3×2 ohms×0.8 A) or 29.6 V, which is a relatively high value, causing relatively high losses by heating.

An object of the present invention is to avoid all or some of the above drawbacks.

SUMMARY OF THE INVENTION

The present invention consists in a remote power feed device for electronic equipment comprising one or more functional systems powered in series by a remote power feed current, each functional system comprising a plurality of functional subsystems each powered by one or more voltages derived from said remote power feed current, with a common reference potential for the various subsystems of the same functional system, said device including two branches in parallel of which a first branch includes in series as many sets of Zener diodes each comprising one or more Zener diodes as there are functional systems to be powered, in which device the other or second branch includes one or more sub-branches in parallel each including one or more Zener diodes, the number of said Zener diodes and their Zener voltage being determined for each sub-branch relative to the number of Zener diodes and the Zener voltage of the Zener diodes of the first branch so that only the Zener diodes of said first branch conduct in normal operation, i.e. in the absence of any overcurrent, and so that the Zener diode or diodes of each sub-branch conduct(s) only in the presence of an overcurrent, and the supply voltage or voltages of the various subsystems of the same functional system being the voltage(s) across a common Zener diode or common Zener diodes of a common set of Zener diodes of said first branch.

Other objects and features of the present invention will emerge from the following description of one embodiment of the invention given with reference to the appended drawings.

DETAILED DESCRIPTION OF THE PREFERRED EMBODIMENTS

Figure 2:
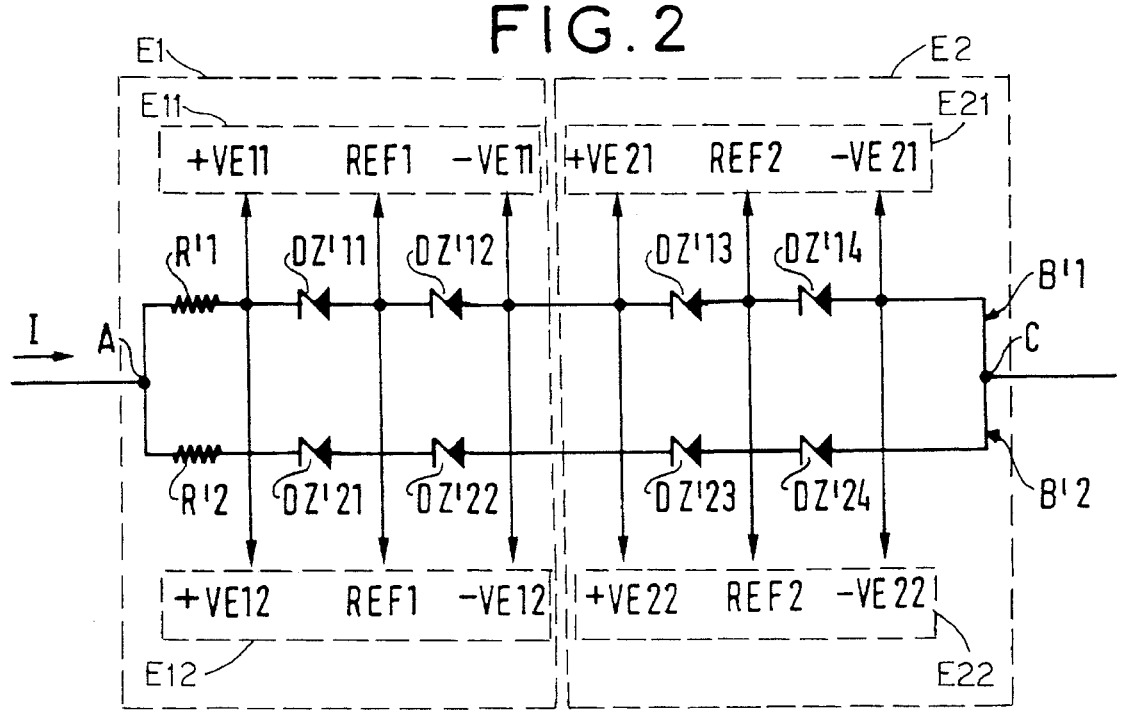
FIGS. 2 and 3 show embodiments of a remote power feed device in accordance with the invention.

The remote power feed device shown in FIG. 2 is included in a remotely powered electronic equipment and has two branches B'1 and B'2 each including four Zener diodes DZ'11, DZ'12, DZ'13 and DZ'14 in the branch B'1 and DZ'21, DZ'22, DZ'23 and DZ'24 in the branch B'2, the Zener diodes DZ'11 and DZ'12 of the branch B'1 forming a first set of Zener diodes and the Zener diodes DZ'13 and DZ'14 of the branch B'1 forming a second set of Zener diodes.

The sum of the Zener voltages of the Zener diodes of a second of these branches is chosen to be greater than the sum of the Zener voltages of the Zener diodes of the first branch so that only the Zener diodes of the first branch conduct in normal operation, i.e. in the absence of any current aggression resulting from example from breakage of the cable carrying the remote power feed current, and so that the Zener diodes of the second branch conduct only in the case of such aggression.

In the FIG. 2 example the sum of the Zener voltages of the Zener diodes of the branch B'2 is chosen to be greater than the sum of the Zener voltages of the Zener diodes of the branch B'1. By way of numerical example relating to the application mentioned above to the remote powering of repeaters or regenerators, the Zener voltage of the Zener diodes of the branch B'1 may be 6.2 V and the Zener voltage of the Zener diodes of the branch B'2 may be 8.2 V.

Consequently:

the positive supply voltages +VE11 and +VE12 of the respective functional subsystems E11 and E12 are the voltage across the same Zener diode DZ'11 the negative supply voltages −VE11 and −VE12 of the respective functional subsystems E11 and E12 are the voltage across the same Zener diode DZ'12 the positive supply voltages +VE21 and +VE22 of the respective functional subsystems E21 and E22 are the voltage across the same Zener diode DZ'13 the negative supply voltages −VE21 and −VE22 of the respective functional subsystems E21 and E22 are the voltage across the same Zener diode DZ'14. (In FIGS. 2 and 3, the lines extending from branch B'1 corresponding to voltages +VE12, REF1, −VE12, +VE22, REF2 and −VE22 are not connected to branch B'2.)

Also, the reference potential REF1 for the functional subsystems E11 and E12 being that at the common point of the Zener diodes DZ'11 and DZ'12 only, and likewise the reference potential REF2 for the functional subsystems E21 and E22 being that at the common point of the Zener diodes DZ'13 and DZ'14 only, each branch includes only one balancing resistor, R'1 for branch B'1 and R'2 for branch B'2 (balancing is required in this example only if there is a requirement for better distribution of the current between the two branches in the event of aggression, because the Zener voltages are different for the two branches).

It is it to be understood that if balancing resistors are present, as is the case in FIG. 2, the sum of the Zener voltages of the Zener diodes of the branch B'2 must be chosen to be greater than the sum of the Zener voltages of the Zener diodes of the branch B'1 plus the voltage drop across the resistor R'1 so that only the Zener diodes of the branch B'1 conduct in normal operation.

The resistor R'1 is localized to that portion of the branch B'1 between the end A of this branch and the point at the potential REF1 but could equally well be localized to that portion of this branch between the point at the potential REF2 and the end C of this branch. On the other hand, this resistor R'1 would not advantageously be localized to that portion of this branch between the points at the potentials REF1 and REF2 as this would increase the voltage difference between the points at the potentials REF1 and REF2 in the event of current aggression.

The resistor R'2 may be localized anywhere in the branch B'2.

With a circuit as shown in FIG. 2, the voltage difference between the points at the reference potentials REF1 and REF2, being equal to the sum of the voltages across the Zener diodes DZ'12 and DZ'13, remains substantially constant event in the event of current aggression due in particular to breakage of the cable carrying the remote power feed current, which simplifies the problems of electrical isolation between functional systems and opens up the possibility of electrical communication between these functional systems.

Figure 1:
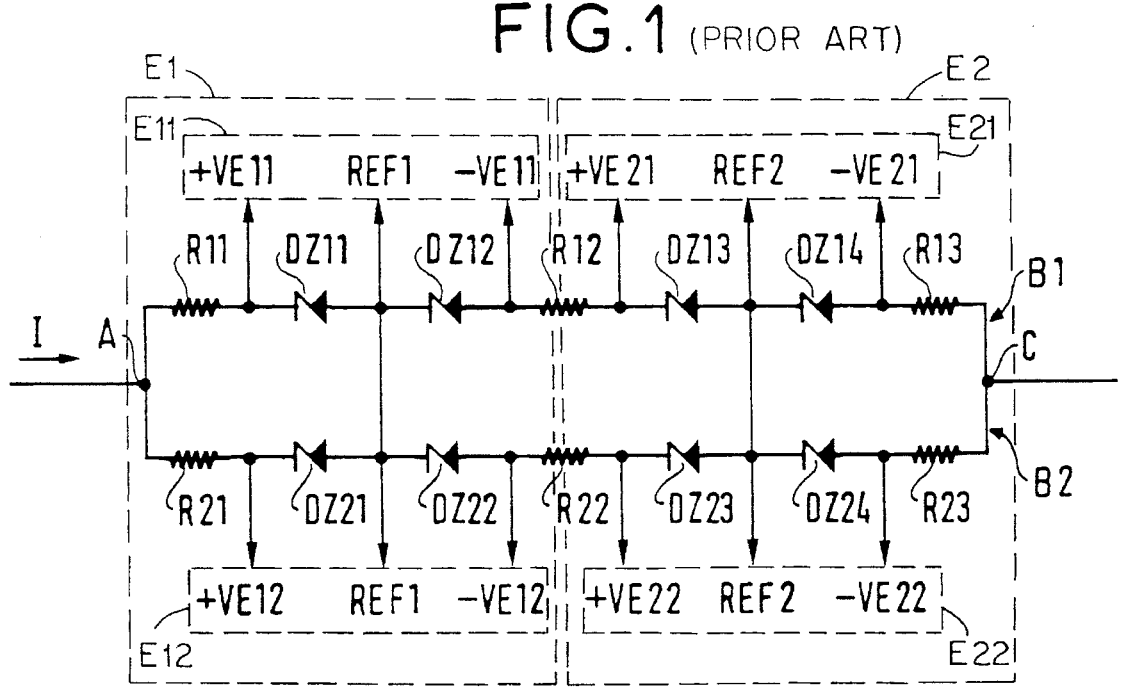
FIG. 1 already described is related to the prior art.

Also, in normal operation, the voltage drop across this device is less than what it would be in the case of the device from FIG. 1 as it is equal, for the same numerical values, to (4×6.2 V)+(1.6 A×2 ohms) or 28 V, which reduces losses by heating.

Note also that, including fewer balancing resistors than the FIG. 1 device, the FIG. 2 device is more economical.

Note also that the number of Zener diodes in that of the branches B'1 and B'2 whose Zener diodes conduct in normal operation (the branch B'1 in this instance) depends on the number of functional systems in the electronic equipment in question while the number of Zener diodes in the other branch does not depend on the number of functional systems.

More generally, the branch B'2 includes one or more Zener diodes whose number and whose Zener voltage are determined relative to the number of Zener diodes and the Zener voltage of the branch B'1 so that only the Zener diodes of the branch B'1 conduct in normal operation, i.e. in the absence of any overcurrent due in particular to breakage of the cable carrying the remote power feed current, and so that the Zener diode or diodes of the branch B'2 conduct(s) only in the presence of an overcurrent.

What is more, the branch B'2 may include a set of sub-branches in parallel, this set possibly reducing to a single sub-branch as in FIG. 2.

The use of a plurality of sub-branches can reduce the current in each of the branches B'1 and B'2 in the event of aggression.

Figure 3:
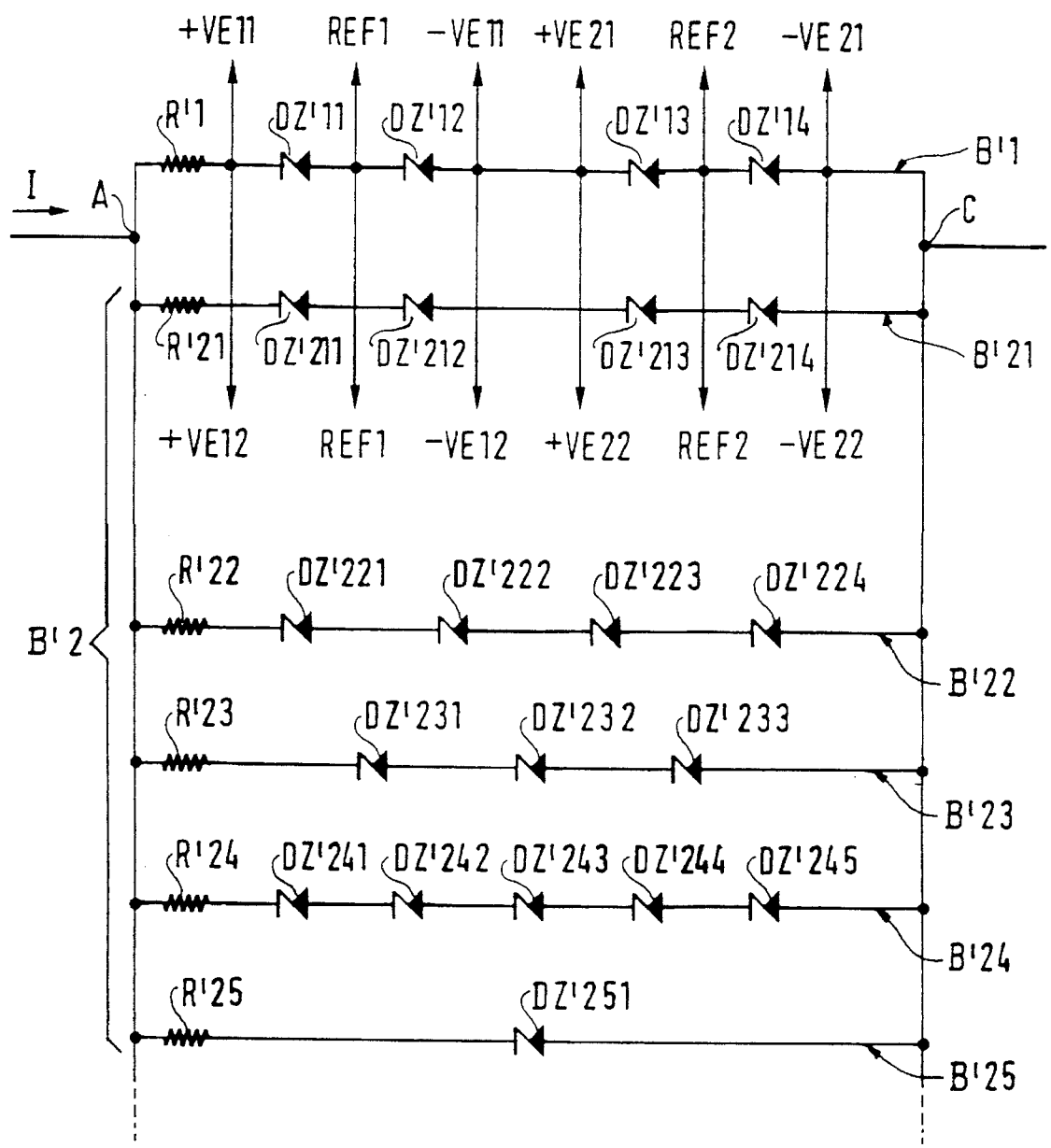

In the remote power feed device shown in FIG. 3 the branch B'2 includes a plurality of sub-branches in parallel B'21, B'22, B'23, B'24, B'25, etc. Each sub-branch includes one or more Zener diodes, the number of Zener diodes and their Zener voltage being determined relative to the number of Zener diodes and the Zener voltage of the Zener diodes of the branch B'1 so that only the Zener diodes of the branch B'1 conduct in normal operation, i.e. in the absence of any overcurrent, and so that the Zener diodes or diodes of each sub-branch B'21, B'22, B'23, B'24, B'25, etc conduct(s) only in the presence of an overcurrent.

In the FIG. 3 example each sub-branch further includes a respective balancing resistor R'21, R'22, R'23, R'24, R'25, etc, again to obtain a better distribution of the current in the event of aggression.

In the FIG. 3 example the sub-branches B'21 and B'22 are identical and each comprise four Zener diodes DZ'211, DZ'212, DZ'213 and DZ'214 for the sub-branch B'21 and DZ'221, DZ'222, DZ'223 and DZ'224 for the sub-branch B'22 and the sub-branches B'23, B'24 and B'25 respectively comprise three Zener diodes DZ'231, DZ'232 and DZ'233, five Zener diodes DZ'241, DZ'242, DZ'243, DZ'244 and DZ'245, and one Zener diode DZ'251.

There is claimed:

1. Remote power feed device for electronic equipment including one or more functional systems powered in series by a remote power feed current, said device comprising:

a first branch including, in series, sets of Zener diodes, each set of Zener diodes comprising one or more Zener diodes, each set of Zener diodes supplying at least one potential difference to one of said functional systems to be powered, and at least one balancing resistor; and a second branch in parallel with said first branch, said second branch including one or more sub-branches in parallel each including one or more Zener diodes, wherein the sum of the voltages across the Zener diode or diodes of each of the sub-branches is greater than the sum of the voltages across the Zener diodes and the at least one balancing resistor of said first branch, so that the Zener diode or diodes of each of the sub-branches conduct(s) only in the presence of an overcurrent.

2. Device according to claim 1, wherein each sub-branch further includes a balancing resistor, wherein the sum of the voltages across the Zener diode or diodes and the balancing resistor of each of the sub-branches is greater than the sum of the voltages across the Zener diodes and the at least one balancing resistor of said first branch, so that the Zener diode or diodes of each of the sub-branches conduct(s) only in the presence of an overcurrent.

3. The device according to claim 1, wherein at least one functional system comprises a plurality of functional subsystems each powered by one or more voltages derived from said remote power feed current, and wherein all the functional subsystems of a same functional system have a common reference potential.

4. The device according to claim 1, wherein said first branch is free of balancing resistors between adjacent sets of Zener diodes.

* * * * *